(12) United States Patent
Zion et al.

(10) Patent No.: US 6,380,297 B1
(45) Date of Patent: Apr. 30, 2002

(54) POLYMER PARTICLES OF CONTROLLED SHAPE

(75) Inventors: Todd C. Zion; Dennis E. Smith, both of Rochester; Hichang Yoon, Fairport; Matthew C. Ezenyilimba, Walworth, all of NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/373,340

(22) Filed: Aug. 12, 1999

(51) Int. Cl.⁷ .................................................. G08L 3/34
(52) U.S. Cl. ...................... 524/493; 430/110; 430/111; 430/137; 524/315; 524/501; 524/500; 524/502; 524/560; 524/561; 524/576; 524/577; 524/579; 524/580; 524/581; 524/583; 524/585; 524/602; 524/672; 524/546
(58) Field of Search ................................. 523/335, 336, 523/337, 338, 339; 430/137; 206/37.87

(56) References Cited

U.S. PATENT DOCUMENTS

| 3,893,935 A | | 7/1975 | Jadwin et al. | |
|---|---|---|---|---|
| 4,323,634 A | | 4/1982 | Jadwin | |
| 4,833,060 A | | 5/1989 | Nair et al. | |
| 4,965,131 A | * | 10/1990 | Nair et al. | 428/407 |
| 5,283,151 A | | 2/1994 | Santilli | |
| 5,290,654 A | * | 3/1994 | Sacripante et al. | 430/137 |
| 5,558,967 A | * | 9/1996 | Nagatsuka et al. | 430/106.6 |
| 5,716,436 A | * | 2/1998 | Sorriero et al. | 106/31.87 |
| 5,968,702 A | * | 10/1999 | Ezenyilimba et al. | 430/111 |
| 6,068,961 A | * | 5/2000 | Dutoff et al. | 430/137 |
| 6,207,338 B1 | * | 3/2001 | Ezenyilimba et al. | 430/137 |

FOREIGN PATENT DOCUMENTS

GB        1420839        1/1976

* cited by examiner

Primary Examiner—David W. Wu
Assistant Examiner—Rip A Lee
(74) Attorney, Agent, or Firm—Lawrence P. Kessler

(57) ABSTRACT

A method for the preparation of polymer particles comprising the steps of: a) forming an organic phase by dissolving a polymer material in a solvent; b) dispersing the organic phase in an aqueous phase comprising a particulate stabilizer and homogenizing the resultant dispersion, thereby forming spherical particles having a selected particle and uniform particle size distribution; c) following the homogenizing, adding a particle shape-modifying surface active material to the spherical particles; and d) removing the solvent, thereby producing irregularly shaped polymer particles having substantially the same selected particle size and particle size distribution as that of the spherical particles.

21 Claims, No Drawings

POLYMER PARTICLES OF CONTROLLED SHAPE

FIELD OF THE INVENTION

This invention relates to a method for the preparation of polymeric powders suitable for use as electrostatographic toner, and more particularly, to a method for the preparation of polymer particles of controlled shape in which surface active materials are employed for controlling shape of the polymer particles.

BACKGROUND OF THE INVENTION

Polymer particles can be prepared by a process frequently referred to as "limited coalescence". In this process, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060 and 4,965,131 to Nair et al., incorporated herein by reference for all that they contain.

U.S. Pat. No. 5,283,151 is representative of earlier work in this field and describes the use of carnauba wax to achieve non-spherical toner shape. The method comprises the steps of dissolving carnauba wax in ethyl acetate heated to a temperature of at least 75° C. and cooling the solution, so resulting in the precipitation of the wax in the form of very fine needles a few microns in length; recovering the wax needles and mixing them with a polymer material, a solvent and optionally a pigment and a charge control agent to form an organic phase; dispersing the organic phase in an aqueous phase comprising a particulate stabilizer and homogenizing the mixture; evaporating the solvent and washing and drying the resultant product.

However, this technique requires the use of elevated temperature to dissolve the wax in the solvent and cooling the solution to precipitate the wax. The wax does not stay in solution of ethyl acetate at ambient temperature and as a result it is very difficult to scale up using this methodology.

The shapes of the toner particles have a bearing on the electrostatic toner transfer and cleaning properties. Thus, for example, the transfer and cleaning efficiency of toner particles have been found to improve as the sphericity of the particles are reduced. Thus far, workers in the art have long sought to modify the shape of the evaporative limited coalescence type toner particles by means other than the choice of pigment, binder, or charge agent. The shape of the toner particles is modified to enhance the cleaning and transfer properties of the toner. For example, U.S. Ser. No. 09/265,750 now U.S. Pat. No. 6,207,338 seeks to modify the shape of the evaporative limited coalescence type particles by a process in which aluminum or gallium salts are introduced into the aqueous phase of the limited coalescence process in a limited amount prior to homogenization. However, U.S. Ser. No. 09/265,750 now U.S. Pat. No. 6,207,338 shows that when aluminum or gallium salts are added to the aqueous phase of a formulation normally yielding spherical particles, the resulting particle diameter decreases anywhere from 10–30%. For example, Comparative Example IV in U.S. Ser. No. 09/265,750 now U.S. Pat. No. 6,207,388 has a size of 6.7 $\mu$m without the aluminum or gallium salts, while their Inventive Example 7, consisting of the same formulation as Comparative Example IV but with the addition of an aluminum salt, has a size of 4.5 $\mu$m. There is, therefore, need in the art for a method of modifying polymer particle shape without affecting the resulting particle size and size distribution.

SUMMARY OF THE INVENTION

In accordance with the present invention, the prior art limitations are effectively obviated by a novel process in which surface active materials are introduced into the aqueous phase of a limited coalescence process after droplets of solvent with dissolved polymer have been dispersed to predetermined and narrow size distributions in an aqueous phase. The use of this novel process results in the formation of non-spherical polymer particles after the solvent is removed. The particle shape is controlled independently of the particle composition (resin, binder matrix, pigment, charge control agent, etc.) and without effecting the particle size or size distribution as pre-established by limited coalescence droplet formation. The degree of non-sphericity is directly related to the surface active material type and concentration.

Thus, viewed from one aspect, the present invention is directed to a method for the preparation of polymer particles comprising the steps of:
   a) forming an organic phase by dissolving a polymer material in a solvent;
   b) dispersing the organic phase in an aqueous phase comprising a particulate stabilizer and homogenizing the resultant dispersion;
   c) adding a surface active material, and
   d) removing the solvent.

Viewed from another aspect, the present invention is directed to a process for preparing electrophotographic toner by dispersing an organic phase in an aqueous phase to yield a layer of particulate suspension stabilizer on the surface of the polymer. The improvement in the process comprises adding the surface active material to the dispersed organic phase droplets, in the aforementioned limited coalescence process, after the step of homogenization, thus modifying the toner's shape, while not affecting the final toner size and size distribution.

It is an advantage of the present invention that elevated temperatures are not needed. It is also an advantage that the toner particle size and size distribution are not adversely affected as they are in the prior art discussed above. This makes it relatively easy to scale up from laboratory flasks to large production equipment.

These and other features and advantages of the present invention will be better understood taken in conjunction with the following detailed description and claims.

DETAILED DESCRIPTION OF THE INVENTION

In accordance with the present invention, a polymer material, a solvent, and optionally, a pigment dispersion and/or charge control agent are combined to form an organic phase in which the solids consist of between 1 and 50% by weight of the total mixture and the pigment concentration can range from about 4% to 20% by weight of total solids. The pigment dispersion is prepared by conventional techniques as, for example, by media milling, melt dispersion and the like. The charge control agent can be employed in an amount ranging from 0 to 10 parts per hundred, based on the total weight of solids, with a preferred range from 0.2 to 3.0 parts per hundred. This mixture is permitted to stir overnight and then dispersed in an aqueous phase comprising a particulate stabilizer and optionally a promoter.

The solvents chosen for use in the organic phase steps may be selected from among any of the well-known solvents capable of dissolving polymers. Typical of the solvents chosen for this purpose are chloromethane, dichloromethane, ethyl acetate, propyl acetate, vinyl chloride, methylethylketone and the like. Ethyl acetate and propyl acetate are preferred.

The particulate stabilizer selected for use herein may be selected from among highly cross-linked polymeric latex materials of the type described in U.S. Pat. No. 4,965,131 to Nair et al., or inorganic oxides such as colloidal silica. Colloidal silica is preferred. It is generally used in an amount ranging from 1 to 15 parts based on 100 parts of the total solids employed. The size and concentration of these stabilizers control and predetermine the size of the final toner particles (i.e., the smaller the size and/or the higher the concentration of such particles, the smaller the size of the final toner particles).

Any suitable promoter that is water soluble and affects the hydrophilic/hydrophobic balance of the solid dispersing agent in the aqueous solution may be employed in order to drive the solid dispersing agent, that is, the particulate stabilizer, to the polymer/solvent droplet-water interface. Typical of such promoters are sulfonated polystyrenes, alginates, carboxy methylcellulose, tetramethyl ammonium hydroxide or chloride, diethylaminoethylmethacrylate, water soluble complex resinous amine condensation products such as the water soluble condensation products of diethanol amine and adipic acid, a particularly suitable one of this type is poly(adipic acid-co-methylaminoethanol), water soluble condensation products of ethylene oxide, urea and formaldehyde and polyethyleneimine. Also effective for this purpose are gelatin, casein, albumin, gluten and the like or non-ionic materials such as methoxycellulose. The promoter is generally used in an amount from about 0.2 to about 0.6 parts per 100 parts of aqueous solution.

Various additives generally present in electrostatograhic toner may be added to the polymer prior to dissolution in the solvent or in the dissolution step itself, such as charge control agents, waxes and lubricants. Suitable charge control agents are disclosed, for example, in U.S. Pat. Nos. 3,893,935 and 4,323,634 to Jadwin et al. and U.S. Pat. No. 4,079,014 to Burness et al.; and British Patent No. 1,420,839 to Eastman Kodak. Charge control agents are generally employed in small quantities such as from about 0 to 10 parts per hundred based upon the weight of the total solids content (weight of the toner) and preferably from about 0.2 to about 3.0 parts per hundred.

The resultant mixture is then subjected to homogenization by mechanical shearing using rotor-stator type colloid mills, high pressure homogenizers, agitation etc. In this process, the particulate stabilizer forms an interface between the organic globules in the organic phase. Due to the high surface area associated with small particles, the coverage by the particulate stabilizer is not complete. After homogenization, coalescence continues until the surface is completely covered by particulate stabilizer. Thereafter, no further growth of the particles occurs. Accordingly, the amount of the particulate stabilizer is inversely proportional to the size of the toner obtained. The relationship between the aqueous phase and the organic phase, by volume may range from 1:1 to approximately 9:1. This indicates that the organic phase is typically present in an amount from about 10% to 50% of the total homogenized volume.

Following the homogenization treatment, a water soluble surface active material is added to the homogenized mixture after which, the solvent present is removed from the mixture by evaporation, vacuum boiling, and/or extraction resulting in the formation of highly non-spherical, irregularly shaped particles. While not wishing to be bound by any particular theory, it is believed that that the surface active material helps to form a "skin" around the dispersed organic phase droplets. Then, when the organic solvent is removed and the volume of the droplet decreases, the original droplet surface area is essentially preserved, resulting in a non-spherical shape. Hence, as used herein, "surface active material" means a substance which goes to the surface of the particulate stabilizer covered organic phase, and forms the "skin" described above.

The surface active material may be anionic, cationic, or nonionic, and, depending on the chemical composition, may comprise 0.0001–50% by weight of the total solids present in the mixture. Examples of such materials are listed in Table 1. By adding the surface active material to the mixture after homogenization and coalescence, the final particle size is relatively unaffected, where adding the material beforehand may lead to a change in the expected particle size.

A spherical particle is well known and is defined as a three dimensional object which has all points on the surface essentially equidistant from a central point. By non-spherical particle is meant a three dimensional object in which individual points on the surface have varying distances from a central point. This will be seen as irregular, or oblong, or wrinkled shapes and surfaces. The surface active material can be anionic, nonionic or cationic. Preferred anionic surface active materials are the products of the condensation polymerization between one or more dicarboxylic acids and an aminoalcohol, diamine, or diol, wherein at least one of the groups contained in one of the organic dicarboxylic acid chains carries a negative charge. Such preferred anionic surface active

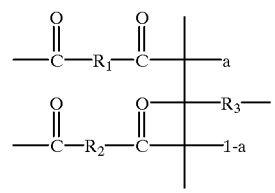

-continued

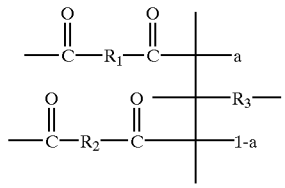

materials may have the general form,
where $R_1$ may be $(CH_2)_n$ or

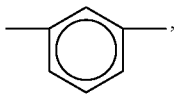

$R_2$ may be 5-(N-potassio-p-toluenesulfonamido) sulfonylisophthalate, N-sodioiminiobis(sulfonyl)-m-benzoate, or 5-sodioisophthalate, $R_3$ may be chosen from the following:

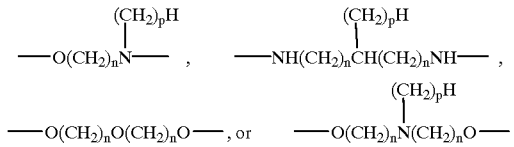

where each n may be independently selected from the integers ranging from 1 to 5, each p may be independently chosen from the integers ranging from 0 to 5, and a ranges from 0.00–0.99.

Preferred nonionic surface active materials are the products of the condensation polymerization between one or more dicarboxylic acids and an aminoalcohol, diamine, or diol. Such preferred nonionic surface active materials

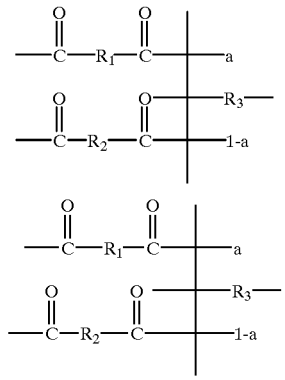

may have the general form,
where $R_1$ may be $(CH_2)_n$ or

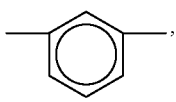

$R_2$ is 1,3-pyridinium isophthalate, $R_3$ may be chosen from the following:

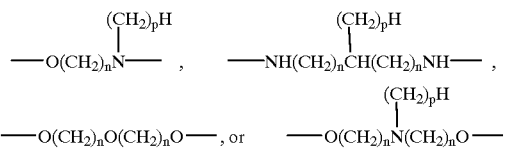

where each n may be independently selected from the integers ranging from 1 to 5, each p may be independently chosen from the integers ranging from 0 to 5, and a ranges from 0.00–1.00.

Additional preferred nonionic surface active materials are polyalkylene oxides, wherein polyalkylene oxides have the form $X—O—[(CH_2)_nO]p—$

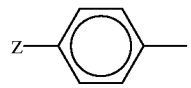

Y, where X has the form $Z(CH_2)_n—$ or

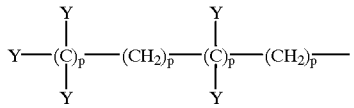

Z has the form, Y may be independently chosen from $(CH_2)_pH$ or $N[(CH_2)_pH]_2$, each n may be independently selected from the integers ranging from 1 to 5, and each p may be independently chosen from the integers ranging from 0 to 5.

Additional preferred nonionic surface active materials are polethyleneimines having the form $H[—(NR)CH_2CH_2—]NH_2$, where R may be H or $[—CH_2CH_2(NR)—]H$; polyallylvinylethers of the form $[—CH_2CH(O(CH_2)_nH)—]$, where n is an integer ranging from 1 to 5; and polyallylacrylamides of the form,

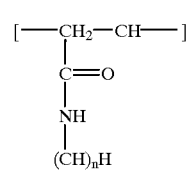

where n is an integer ranging from 1 to 5.

Preferred cationic surface active materials are ammonium salts having the general form,

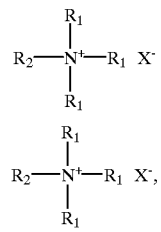

where X may be $H_2PO_4$, OH, or Cl, each $R_1$ may be individually selected from the form $(CH_2)_nY$, where Y may be either

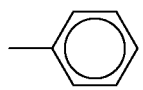

or —H, and $R_2$ has the form $(CH_2)_nZ$, where Z may be —H or —NHOOC$(CH_2)_p$CH$_3$, each n may be individually selected from the integers ranging from 0 to 5, and p may be an integer from 0 to 20.

Additional preferred cationic surface active materials are the products of the condensation polymerization between one or more dicarboxylic acids and an aminoalcohol, diamine, or diol, wherein at least one of the groups contained in one of the organic dicarboxylic acid chains carries a positive charge. Such cationic surface active materials have the general form,

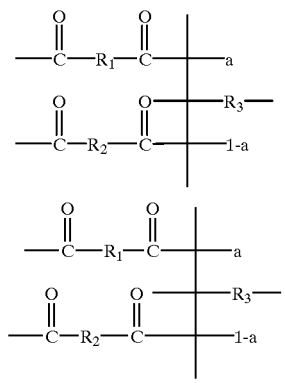

where $R_1$ may be $(CH_2)_n$ or

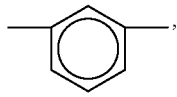, $R_2$ is phenylmethylphosphonium 4,4'-benzamide p-toluenesulfonate, $R_3$ may be chosen from the following:

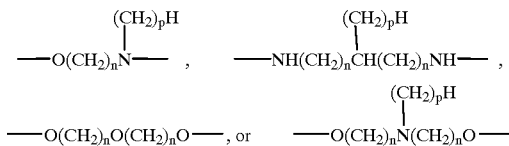

where each n may be independently selected from the integers ranging from 1 to 5, each p may be independently chosen from the integers ranging from 0 to 5, and a ranges from 0.00–0.99.

As indicated, the present invention is applicable to the preparation of polymeric particles from any type of polymer that is capable of being dissolved in a solvent that is immiscible with water and includes compositions such as, for example, olefin homopolymers and copolymers, such as, polyethylene, polypropylene, polyisobutylene and polyisopentylene; polytrifloroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polymethylacrylate, polyethylmethacrylate and styrene-methylmethacrylate; ethylene-methylacrylate copolymers, ethylene-ethyl acrylate copolymers, ethylene-ethyl methacrylate copolymers, polystyrene and copolymers of styrene with unsaturated monomers, cellulose derivatives, polyesters, polyvinyl resins and ethylene-allyl alcohol copolymers and the like.

Pigments suitable for use in the practice of the present invention should be capable of being dispersed in the polymer, insoluble in water and yield strong permanent color. Typical of such pigments are the organic pigments such as phthalocyanines, lithols and the like and inorganic pigments such as TiO2, carbon black and the like. Typical of the phthalocyanine pigments are copper phthalocyanine, a mono-chlor copper phthalocyanine, and hexadecachlor copper phthalocyanine. Other organic pigments suitable for use herein include anthraquinone vat pigments such as vat yellow 6GLCL1127, quinone yellow 18-1, indanthrone CL1106, pyranthrone CL1096, brominated pyranthrones such as dibromopyranthrone, vat brilliant orange RK, anthramide brown CL1151, dibenzanthrone green CL1101, flavanthrone yellow CL1118; azo pigments such as toluidine red C169 and hansa yellow; and metallized pigments such as azo yellow and permanent red. The carbon black may be any of the known types such as channel black, furnace black, acetylene black, thermal black, lamp black and aniline black. The pigments are employed in an amount sufficient to give a content thereof in the toner from about 1% to 40%, by weight, based upon the weight of the toner, and preferably within the range of 4% to 20%, by weight.

The invention will be more fully understood by reference to the following exemplary embodiment, which is set forth solely for purposes of exposition and is not to be construed as limiting.

EXAMPLE I (COMPARATIVE)

To 1,212.0 g of ethyl acetate was added 303.0 g of commercially available polyester-based polymer Kao P, and the resulting mixture was allowed to stir overnight. To 750.0 g of the organic phase was added an aqueous phase comprising 2,240.6 g of pH4 buffer containing 50.4 g of Ludox® ™ (colloidal silica from DuPont) and 10.8 g of 10% poly (adipic acid-co-methylaminoethanol). This mixture was stirred using a pitched-blade turbine laboratory agitator at 400 RPM for five minutes and then passed through a Gaulin homogenizer at 350 kg/cm$^2$. Upon exiting, 655.0 g of the homogenized mixture was stirred overnight at room temperature in an open container to remove the solvent. The resulting particles were spherical, approximately 4.5 µm in diameter and had a narrow particle size distribution.

EXAMPLE 2 (INVENTIVE)

To another 655.0 g of the homogenized mixture prepared in Example 1 was added 6.5 g of a 1% aqueous solution of Cyastat® SP (1% w/w Cyastat® SP/Kao P), and the resulting mixture was stirred overnight at room temperature in an open container to remove the solvent. Cyastat SP®, manufactured by American Cyanamid, is a quaternary alkyl ammonium salt w/one alkyl chain containing an amide functional group and the other containing an alcohol functional group. The resulting particles were irregularly-shaped, approximately 4.5 µm in diameter, and had a narrow particle size distribution.

EXAMPLE 3 (COMPARATIVE)

Another organic/aqueous mixture was prepared by combining 750.0 g of the remaining organic phase from Example 1 with an aqueous phase comprising 2,240.6 g of pH4 buffer containing 50.4 g of Ludox® ™ and 10.8 g of 10% poly (adipic acid-co-methylaminoethanol) plus 29.2 g of a 1% aqueous solution of Cyastat® SP (1% w/w Cyastat® SP/Kao P). This mixture was stirred using a pitched-blade turbine laboratory agitator at 400 RPM for five minutes and then passed through a Gaulin homogenizer at 350 kg/cm$^2$. Upon exiting, 655.0 g of the homogenized mixture was stirred overnight at room temperature in an open container to remove the solvent. The resulting particles were irregularly-shaped but contained a broad distribution of diameters ranging from 0.5 μm to 10 μm with a median diameter at approximately 3.5 μm.

In Comparative Example 1 where no surface active material is included in the formulation, the resulting toner particles are spherical; while Example 2 with a surface active material added in the formulation, the toner particles are irregular in shape.

Furthermore, Inventive Example 2 and Comparative Example 3 demonstrate that the sequence in the process steps is important. When the surface active material is added after homogenization (See, Example 2), the particle size and size distribution of the toner are the same as when no surface active material is added. However, when the surface active material is added before homogenization (See, Example 3), the particle size is different and size distribution of the toner particles is unexpectedly broader than when no surface active material is added.

Hence, the present invention provides toner particles that are irregular in shape without adversely affecting particle size or size distribution. This result is not suggested in the art and could not have been expected.

EXAMPLES 4–18

To 1,212.0 g of ethyl acetate was added 303.0 g of commercially available polymer designated P, and the resulting mixture was allowed to stir overnight. To the entire organic phase was added an aqueous phase comprising 1,475.4 g of pH4 buffer containing 50.9 g of Ludox® ™ and 10.9 g of 10% poly (adipic acid-co-methylaminoethanol). This mixture was stirred for at least five minutes and then passed through a Gaulin homogenizer at 350 kg/cm$^2$. Upon exiting, a 50.0 g sample was taken out of the homogenized mixture, to which was added a surface active material designated X. The weight % of pure additive X based on the amount of solid polymer present in the sample is designated C. After the introduction of 0.001% of surface active material, X, a portion of the sample was taken out and allowed to evaporate at room temperature. The resulting particles were observed using a microscope and determined to be highly spherical or non-spherical. The concentration, C, of material, X, was then increased if necessary until the evaporated system yielded particles of an irregular shape. Another 50.0 g sample was then taken and the procedure repeated with other various surface active additives. Table 1 summarizes results obtained from a variety of additives on two different polymer systems.

TABLE 1

Summary of experimental results using various anionic surface active materials.

| | | X/P = % for Polymer, P | |
| --- | --- | --- | --- |
| Inventive Example | Anionic Surface Active Material X | P = Kao P Polyester | P = Piccotoner 1221 - Styrene-Butylacrylate |
| 4 | poly[N-methyl aminoethylene adipate-co-5-sodioisophthalate (80/20)] | 0.003: Completely Irregular | N/A |
| 5 | poly[N-methyl aminodiethylene adipate-co-5-sodioisophthalate (90/10)] | 0.003: Completely Irregular | N/A |
| 6 | poly[N-ethylaminodiethylene adipate-co-5-sodioisophthalate (90/10)] | 0.004: Completely Irregular | N/A |
| 7 | poly[N-methyl aminoethylene adipate-co-N-sodioiminiobis (sulfonyl)-m-benzoate(90/10)] | 0.003: Completely Irregular | N/A |

TABLE 2

Summary of experimental results using various nonionic surface active materials.

| | | X/P = % for Polymer, P | |
| --- | --- | --- | --- |
| Inventive Example | Nonionic Surface Active Material X | P = Kao P Polyester | P = Piccotoner 1221 - Styrene-Butylacrylate |
| 8 | Poly[2-(2-methylamino) ethyl | 1.0: Spherical 5.0: Some Irregular | No effect up to 30.0 |

TABLE 2-continued

Summary of experimental results using various nonionic surface active materials.

| | | X/P = % for Polymer, P | |
|---|---|---|---|
| Inventive Example | Nonionic Surface Active Material X | P = Kao P Polyester | P = Piccotoner 1221 - Styrene-Butylacrylate |
| | adipate] | 10.0: Mostly Irregular<br>20.0: Completely Irregular<br>30.0: Completely Irregular | |
| 9 | Jeffamine ® D-2000 (polyoxypropylenediamine from Texaco) | 0.003: Completely Irregular | 0.06: Spherical<br>0.28: Irregular<br>0.56: (Dispersion Became Unstable) |
| 10 | Octylphenoxypolyethoxy-ethanol | 0.003: Spherical<br>0.03: Spherical<br>0.06: Spherical<br>0.28: Completely Irregular | 0.28: Spherical<br>0.56: Spherical<br>1.68: Some Irregular<br>2.80: Completely Irregular |
| 11 | Poly(methyl vinyl ether) | 0.003: Spherical<br>0.006: Spherical<br>0.20: Irregular | 0.60: Some Irregular<br>0.70: Completely Irregular<br>1.00: Completely Irregular |
| 12 | Poly(ethyleneimine) | 0.003: Some Irregular<br>0.006: Some Irregular<br>0.008: Irregular | 0.03: Spherical<br>0.30: Some Irregular<br>1.00: Irregular (Dispersion Became Unstable Over Time) |
| 13 | Poly[N-Isopropylacrylamide] | 0.003: Some Irregular<br>0.006: Some Irregular<br>0.008: Completely Irregular | 0.20: Spherical<br>0.80: Completely Irregular |
| 14 | poly[N-methyl aminoethylene adipate-co-1,3-pyridinium isophthalate (90/10)] | 0.003: Completely Irregular | N/A |
| 15 | poly[2-methyl pentamethylene adipamide-co-3-pyridinium isophthalamide (90/10)] | 0.003: Completely Irregular | N/A |

TABLE 3

Summary of experimental results using various cationic surface active materials.

| | | X/P = % for Polymer, P | |
|---|---|---|---|
| Inventive Example | Cationic Surface Active Material X | P = Kao P Polyester | P = Piccotoner 1221 - Styrene-Butylacrylate |
| 16 | Cyastat ® SP (alkyl quarternary ammonium salt from American Cyanamid) | 0.008: Spherical<br>0.08: Some Irregular<br>0.16: Completely Irregular | 0.28: Spherical<br>0.56: Irregular (Dispersion Became Unstable Over Time) |
| 17 | poly[N-methyl aminoethylene adipate-co-triphenylmethyl phosphonium p-toluenesulfonate (90/10)] | 0.018: Some Irregular<br>0.023: Completely Irregular | N/A |
| 18 | triethylphenyl ammonium hydroxide | 0.003: Spherical<br>0.006: Completely Irregular | N/A |

Examples 4–18 above show that several anionic surface active materials (See, Table 1, Inventive Examples 4–7), several nonionic surface active materials (See, Table 2, Inventive Examples 8–15), and several cationic surface active materials (See, Table 3, Inventive examples 16–18), in low to high concentrations, will give irregularly shaped polymer particles; and that when added after, rather than before, homogenization in an evaporative limited coalescence process will not affect particle size or distribution.

The invention has been described in detail with particular reference to certain preferred embodiments thereof, but it will be understood that variations and modifications can be effected within the spirit and scope of the invention.

What is claimed is:

1. A method for the preparation of polymer particles comprising the steps of:
   a) forming an organic phase by dissolving a polymer material in a solvent;
   b) dispersing the organic phase in an aqueous phase comprising a particulate stabilizer and homogenizing the resultant dispersion, thereby forming spherical particles having a selected particle size and uniform particle size distribution;
   c) following the homogenizing, adding a particle shape-modifying surface active material to the spherical particles; and
   d) removing the solvent, thereby producing irregularly shaped polymer particles having substantially the same selected particle size and particle size distribution as that of the spherical particles.

2. The method of claim 1 further comprising the step of washing and drying the irregularly shaped polymer particles produced in step d).

3. The method of claim 1 wherein addenda selected from charge control agent and pigment are added in step a).

4. The method of claim 1 wherein a promoter is added in step b).

5. The method of claim 1 wherein the organic solvent is selected from the group consisting of chloromethane, dichloromethane, ethyl acetate, n-propyl acetate, iso-propyl acetate, vinyl chloride, methyl ethyl ketone, trichloromethane, carbon tetrachloride, ethylene chloride, trichloroethane, toluene, xylene, cyclohexanone and 2-nitropropane.

6. The method of claim 1 wherein the organic solvent is selected from propyl acetate and ethyl acetate.

7. The method of claim 1 wherein the particle shape-modifying surface active material is selected from the group consisting of cationic surface active material, anionic surface active material, and nonionic surface active material.

8. The method of claim 7 wherein the cationic surface active material is an ammonium salt or a condensation polymerization product of one or more dicarboxylic acids and an aminoalcohol, diamine, or diol, wherein at least one group contained in an organic dicarboxylic acid chain carries a positive charge.

9. The method of claim 7 wherein the anionic surface active material is a condensation polymerization product of one or more dicarboxylic acids and an aminoalcohol, diamine, or diol, wherein at least one group contained in an organic dicarboxylic acid chain carries a negative charge.

10. The method claim 7 wherein the nonionic surface active material is selected from the group consisting of a polyalkylene oxide, a polyethyleneimine, a polyallylvinylether, a polyallylacrylamide, and a polymerization condensation product of one or more dicarboxylic acids and an aminoalcohol, diamine, or diol.

11. The method of claim 1 wherein the surface active material to polymer ratio ranges from 0.0001 to about 50% by weight of total solids dissolved in the mixture.

12. The method of claim 1 wherein the particulate stabilizer is selected from the group consisting of highly cross-linked latex polymeric material, and colloidal silica.

13. The method of claim 1 wherein the amount of particulate stabilizer is between 1 to 15 parts based on 100 parts of total solids in the polymer particles.

14. The method of claim 1 wherein the relationship in volume between the aqueous phase and the organic phase ranges from 1:1 to 9:1.

15. The method of claim 1 wherein the organic phase contains addenda selected from lubricants and waxes.

16. The method of claim 1 wherein the polymer material is selected from the group consisting of olefin homopolymers and copolymers, polytrifluoroolefins, polyamides, acrylic resins, polystyrene and copolymers of styrene with unsaturated monomers, cellulose derivatives, polyesters, polyvinyl resins and ethylene-allyl alcohol copolymers.

17. The method of claim 16 wherein the polymer material is selected from the group consisting of polyethylene, polypropylene, polyisobutylene, polyisopentylene, polytetrafluoroethylene, polytrifluorochloroethylene, polyhexamethylene adipamide, polyhexamethylene sebacamide, polycaprolactam, polymethylmethacrylate, polymethylacrylate, polyethylmethacrylate styrene-methylmethacrylate, ethylene-methylacrylate copolymers, ethylene-ethyl acrylate copolymers, and ethylene-ethyl methacrylate copolymers.

18. The method of claim 1 wherein the polymer material is selected from the group consisting of polyester and butyl acrylate-styrene copolymer.

19. The method of claim 3 wherein the pigment employed comprises from 1.0 to 40.0 weight %, based upon the weight of total solids present in the polymer particles.

20. The method of claim 3 wherein the pigment employed comprises from 4.0 to 20.0 weight %, based upon the weight of total solids present in the polymer particles.

21. Electrophotographic toner particles produced by the method described in claim 1.

* * * * *